United States Patent [19]
Ekdahl

[11] 3,747,760
[45] July 24, 1973

[54] METHOD OF RECOVERING OIL FROM A WATER SURFACE

[75] Inventor: Wendell Graydon Ekdahl, Martinsville, N.J.

[73] Assignee: Johns-Manville Corporation, New York, N.Y.

[22] Filed: Mar. 23, 1972

[21] Appl. No.: 237,419

[52] U.S. Cl. .......................... 210/84, 210/DIG. 21
[51] Int. Cl. .......................................... B01d 21/00
[58] Field of Search .............. 210/83, 242, DIG. 21, 210/84

[56] References Cited
UNITED STATES PATENTS

| | | | |
|---|---|---|---|
| 3,664,505 | 5/1972 | Brittingham | 210/242 |
| 3,523,611 | 4/1969 | Fitzgerald | 210/242 |
| 3,630,376 | 12/1971 | Price | 210/242 |

Primary Examiner—Samih N. Zaharna
Assistant Examiner—T. A. Granger
Attorney—John A. McKinney, Robert M. Krone et al.

[57] ABSTRACT

A method for recovering oil from a water surface, wherein the water carrying the oil is flowing in a specific direction relative to a barrier, comprises containing the oil in the barrier to form a confined oil slick having a leading edge. Due to the flow of the water, a head-wave is formed along the leading edge of the confined oil slick and oil removal aparatus is located at the head-wave to remove oil from the head-wave.

2 Claims, 4 Drawing Figures

PATENTED JUL 24 1973  3,747,760

METHOD OF RECOVERING OIL FROM A WATER SURFACE

BACKGROUND OF THE INVENTION

The present invention relates to a method of recovering oil from a water surface which can be used on the high seas, in harbors, on rivers and elsewhere.

When oil is spilled upon water in order to recover the oil, it is necessary to intercept and trap or contain the oil in a barrier. In some instances it is desirable to build up a reservoir of the spilled material. Then the oil is removed from the surface by pumping apparatus or by some other conventional skimming means. Under certain circumstances, all oil containment barriers will leak the entrapped oil to a certain extent. The amount of leakage is obviously related to wind, water and other environmental conditions.

Field tests by applicant have shown that oil contained in a barrier will form a head-wave at its leading edge when there is relative movement between the barrier and the water on which the oil is floating. A head-wave is a pool of oil along the leading edge of the confined oil slick which extends deeper into the water then the remainder of the confined oil slick. The depth of the head-wave is typically twice the depth of the remaining portion of the confined oil slick and can be four times the depth of the remaining portion of the confined oil slick.

It is thought that the head-wave is formed by the forces of the oncoming current and/or oil influx against the oil at the leading edge of the confined slick within the barrier. Since the oil cannot compress, move upward, or move backward against the oncoming currents to any great extent, the forces or pressures on the oil can only be relieved by the oil moving both laterally along the leading edge of the confined oil slick and to a lesser extent, downward. Thus, the oil is forced along the head-wave until the oil contacts the barrier. At this point the oil follows the inner face of the barrier downward and upon reaching the bottom of the barrier, the oil is free to escape thereby relieving the pressure.

In addition, globules of oil break away or are torn away from the head-wave, along the oil-water interface, by the water which flows past and under the relatively static head-wave. While these globules generally have a tendency to rise toward the surface and consequently rejoin the confined oil slick, a large portion of the globules are carried by the water beneath the barrier. This is especially true when the relative water velocity is great and/or temperature conditions are such that the bouyancy of the oil more nearly approaches that of water.

The oil that passes beneath the bottom of the barrier rises along the outer face of the barrier, collects at the water surface, and is drawn by the current along the outer face of the barrier until it finally collects at the apex or bucket of the barrier. There the oil builds up into a slick and finally breaks away from the outer surface of the barrier. Consequently while the prime area of leakage is at the junctures between the head-wave and the barrier, it appears that the leakage is occuring at the bucket rather than at the head-wave.

When oil removal devices are located at locations within the barrier other than at the head-wave, such as between the head-wave and the bucket, the capacity of the apparatus must be significantly greater to recover the same quantity of oil as apparatus along the head-wave. This is due to greater proportion of water which is recovered with the oil at locations behind the head-wave where the slick is thinner. Furthermore, the oil containment barriers may leak even when the recovery rate by the apparatus exceeds the spill rate. This is due to the inability of the oil removal apparatus to effectively reduce the pressures along the head-wave which force the oil laterally toward and beneath the sidewalls of the barrier plus the inability of the apparatus to reduce the protruding oil-water interface between the head-wave and the water.

It is an object of the present invention to eliminate or minimize oil leakage from an oil barrier by placing oil removal devices at certain critical locations within the barrier.

Accordingly, the present invention provides an improved method for removing oil from a water surface wherein the oil flows into a containing barrier, the oil is contained in the barrier forming a confined oil slick having a leading edge and a head-wave is formed along the leading edge of the oil slick. The improvement comprises locating oil removal apparatus at the head-wave and removing oil from the head-wave with the oil removal apparatus. In a preferred form of the invention, the oil is removed by locating the oil removal means at least at each end of the head-wave adjacent the barrier to remove the oil from the head-wave at these locations.

DETAILED DESCRIPTION OF THE INVENTION

Figure 1:
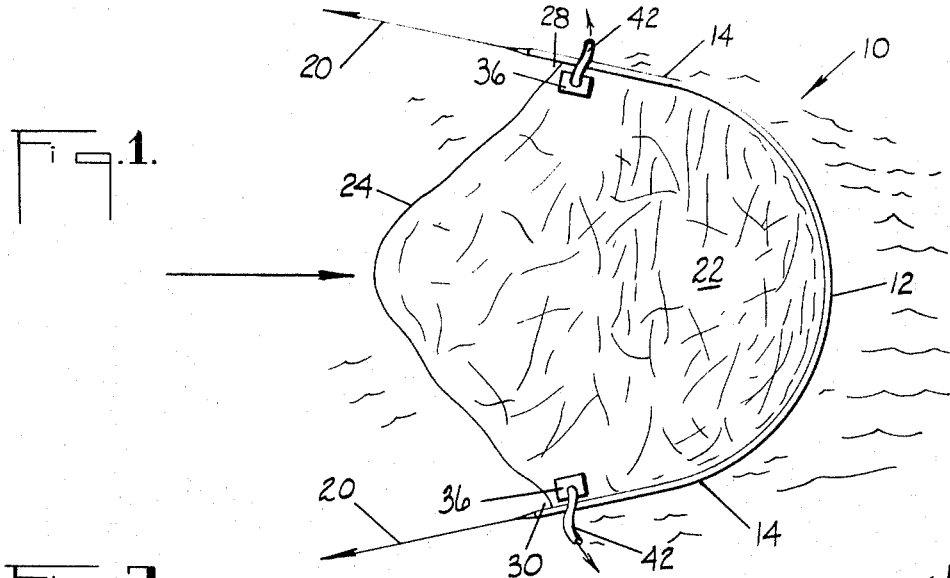
FIG. 1 is a plan view of an oil barrier with oil removal apparatus placed adjacent the ends of a head-wave according to the method of the present invention.

FIGS. 1 through 4 illustrate oil recovery operations according to the method of the present invention. A conventional barrier 10 having an apex or bucket portion 12 joining sidewall portions 14 is used to confine the oil. The barrier is designed to float in the water with a lower portion 16 of the barrier submerged and an upper portion 18 of the barrier extending above the surface of the water. Tow lines or anchoring lines 20 are provided at each end of the barrier to secure the barrier to towing vessels or suitable anchorages (not shown).

Figure 4:
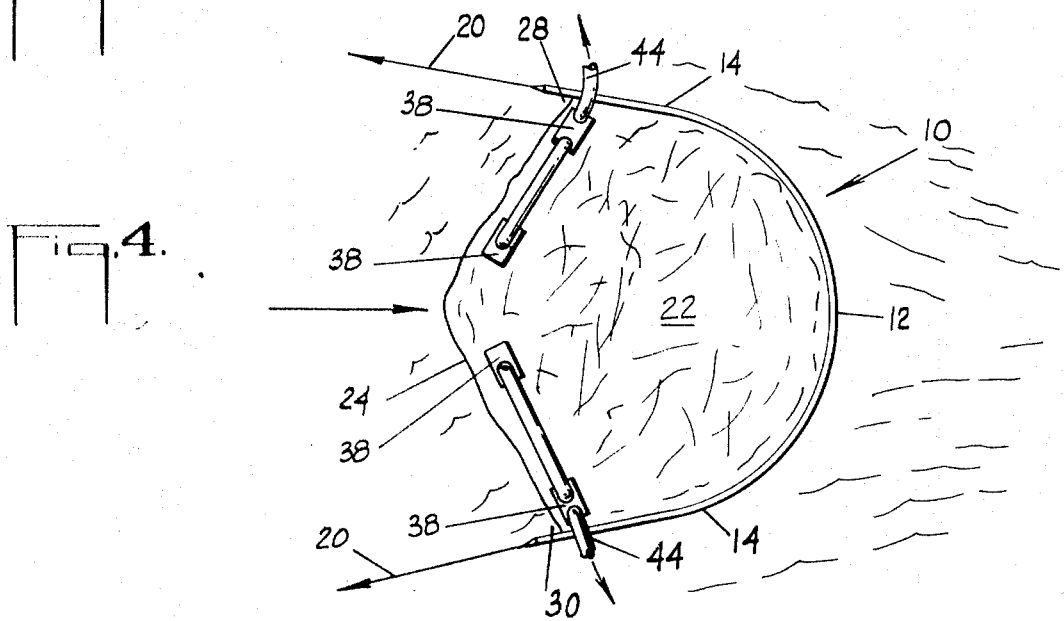
FIG. 4 is a plan view of an oil barrier with oil removal apparatus placed along the length of a head-wave according to the method of the present invention.

The direction of flow of the water relative to the barrier 10 is shown by arrows in FIG. 1 and 4. The flow of the water in this direction can be caused by any number of factors with the direction of flow being the important aspect and not the cause for the flow in that direction. For example, the water could be caused to flow in the given direction relative to the barrier by a current and/or by towing the barrier through an oil slick. However, as a result of this relative flow between the water and the barrier 10 an oil slick 22 builds up within the confines of the barrier 10.

Figure 2:
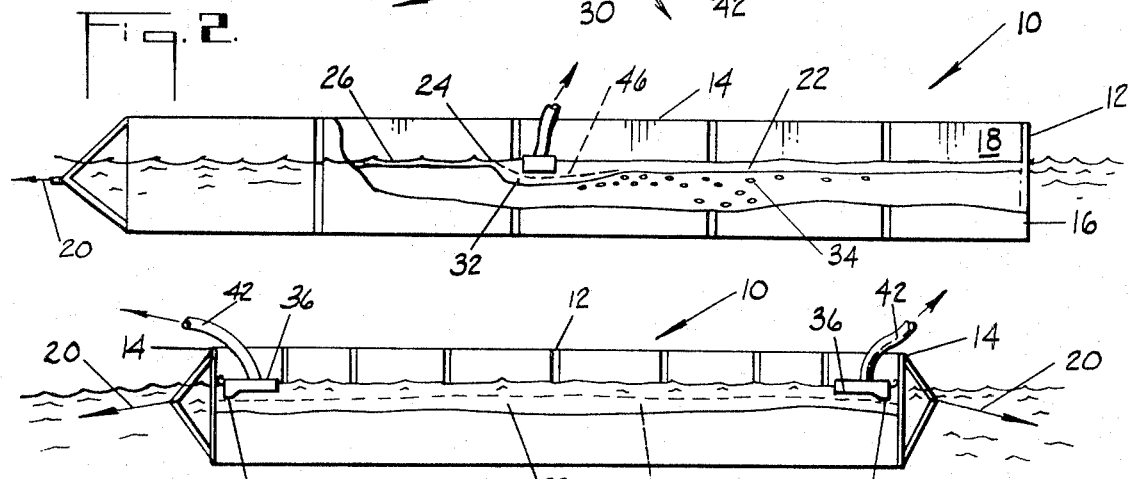
FIG. 2 is an elevational side view of the barrier with portions thereof broken away to better illustrate the formation of the head-wave at the leading edge of the oil slick.
Figure 3:
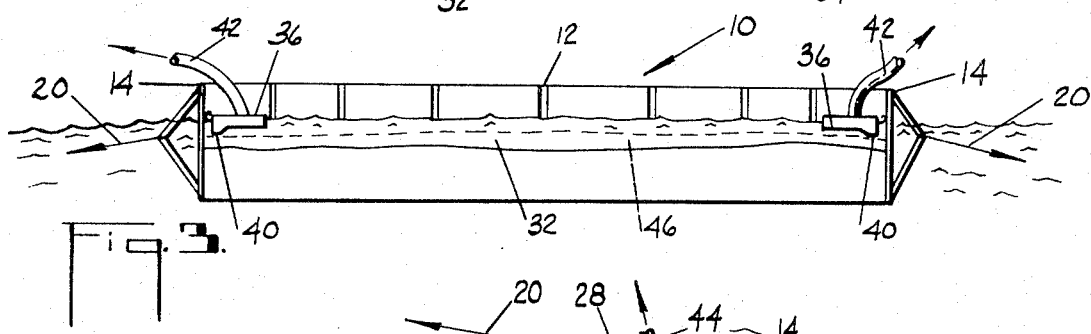
FIG. 3 is a front elevational view of the barrier illustrating the contour of the head-wave and the placement of the oil removal apparatus adjacent the oil barrier where the head-wave meets the oil barrier.

This oil slick 22 has a leading edge 24 where the slick 22 meets open water or a relatively thin layer of oil 26 being carried by the water into the barrier 10. In plan view, the leading edge 24 of the confined oil slick generally assumes a parabolic or convex configuration between points 28 and 30 of the barrier sidewalls. Along the leading edge 24 a head-wave 32 of oil is formed. The head-wave 32 extends along the entire length of the leading edge 24 meeting the barrier at points 28 and 30. As best shown in FIG. 2, the oil-water interface when vieing the head-wave in transverse cross-section, is generally convex with the thickness or depth of the oil slick at this point being substantially greater (two to four times thicker) than the remaining portion of the oil slick imtermediate the head-wave 32 and the bucket portion 12 of the barrier. In transverse cross-section, the leading edge of the head-wave is blunter than the trailing edge of the head-wave which gradually merges with the remaining portion of the oil slick 22. The width of the head-wave is independent of the length of the head-wave or the distance between the sidewalls 14 and the amount of oil contained within the barrier but is dependent on the relative velocity of the water with respect to the barrier and the thickness of the oil slick. As best shown in FIG. 3, the head-wave is substantially the same thickness or depth along its entire length between points 28 and 30 where the head-wave meets the sidewalls 14 of the barrier.

Globules 34 of oil are shown in FIGS. 2 and 3. These globules ordinarily break away or are torn away from the head-wave by the scrubbing action of the water which then carries the globules beneath the barrier. However, when recovering the oil according to the method of the present invention the loss of these globules beneath the barrier is minimized.

According to the method of the present invention, conventional oil removal apparatus 36 is placed at each end of the head-wave 32 adjacent the barrier sidewalls 14 as shown in FIG. 1 or conventional oil removal apparatus 38 is placed along the entire length of the head-wave 32 as shown in FIG. 4. The number and spacing of the oil removal apparatus 38 placed along the head-wave 32 can vary as long as units are placed at the ends of the head-wave adjacent the barrier 10.

The oil removal apparatus 36 and 38 is representative of oil removal apparatus wherein oil is pumped from the surface of the water through inlets 40 of the apparatus. Thereafter, the oil-water mixture is discharged through hoses 42 and 44 to barges or other vessels (not shown) having means to store and/or dispose of the oil removed from the water surface including, when necessary, means to separate oil from any recovered water. Of course, it is contemplated that various types of conventional oil removal apparatus can be utilized. The oil removal apparatus 36 and 38 should be capable of movement within the barrier 10 so that the apparatus can be maintained at the head-wave 32 even when the position of the head-wave changes relative to the barrier.

The oil removal apparatus 36 or 38 should have a combined oil removal capacity at least sufficient to remove the oil at a rate to overcome the forces tending to drive the oil downward and out from beneath the barrier. Preferably, the combined capacity of the oil removal apparatus 36 or 38 is equal to or greater than the rate at which oil is being added to slick 22. Thus, when the oil recovery apparatus 36 or 38 is recovering oil from the head-wave 32, it reduces the depth of the head-wave, especially adjacent the points of actual recovery. The head-wave 32 then becomes less prominent, as shown by phantom line 46 in FIGS. 2 and 3, and at least approaches the thickness of the remaining portion of the confined oil slick 22. Consequently, the tendency of the water to scrub off globules of oil from the head-wave 32 is minimized by reducing the profile of the oil-water interface and the pressures tending to force the oil down and beneath the barrier where the head-wave meets the barrier are also minimized. By placing the oil removal apparatus adjacent the ends of the head-wave 32 at the barrier, the pressure is relieved and the depth of the head-wave is reduced at the very point where the pressures on the oil and the depth of the head-wave would ordinarily be causing the oil to flow beneath the barrier. Of course, additional oil removal apparatus can be placed intermediate the head-wave 32 and the bucket portion 12 of the barrier. However, the critical locations are adjacent each end of the head-wave adjacent the barrier and to a lesser extent anywhere along the head-wave.

Various conditions, such as the amount of oil influx relative to the rate of oil removal, will cause the position of the head-wave 32 within the barrier 10 to change. As conditions vary, the position of the head-wave 32 will, at times, either recede toward the bucket portion 12 or advance toward the mouth of the barrier. Thus, it is necessary to move the oil apparatus properly located along the head-wave.

What I claim is:

1. A method of recovering oil from a water surface comprising:
   a. providing a containing barrier having a sidewall portions and a bucket portion joining the sidewall portions;
   b. partially enclosing oil on a water surface within the barrier to form a confined oil slick;
   c. effecting relative movement between the barrier and the water to form a head-wave along a leading edge of the confined oil slick which extends between the sidewalls of the barrier;
   d. providing oil removal means;
   e. locating and maintaining said oil removal means at each end of said head-wave adjacent the barrier; and
   f. removing oil from the head-wave with said oil removal means.

2. A method as claimed in claim 1 and further comprising:
   a. locating and maintaining additional oil removal means along said head-wave and intermediate said oil removal means at each end of said head-wave.

* * * * *

PO-1050
(5/69)

UNITED STATES PATENT OFFICE
CERTIFICATE OF CORRECTION

Patent No. 3,747,760          Dated July 24, 1973

Inventor(s) Wendell Graydon Ekdahl

It is certified that error appears in the above-identified patent and that said Letters Patent are hereby corrected as shown below:

Column 1, line 9, after "elsewhere.", insert -- The invention herein described was made in the course of or under a contract or subcontract thereunder, with the United States Coast Guard. --

Column 3, line 14, "vieing" should be --viewing--

Signed and Sealed this

Twenty-second Day of February 1977

[SEAL]

Attest:

RUTH C. MASON
*Attesting Officer*

C. MARSHALL DANN
*Commissioner of Patents and Trademarks*